United States Patent [19]
Lach

[11] Patent Number: 5,953,343
[45] Date of Patent: Sep. 14, 1999

[54] DIGITAL INFORMATION TRANSFER SYSTEM AND METHOD

[75] Inventor: Jorge E. Lach, Lexington, Mass.

[73] Assignee: Sun Microsystems, Inc., Palo Alto, Pa.

[21] Appl. No.: 08/756,657

[22] Filed: Nov. 26, 1996

[51] Int. Cl.$^6$ .................................................. H04L 12/54
[52] U.S. Cl. ........................ 370/428; 370/362; 370/363
[58] Field of Search .................................... 370/438, 439, 370/362, 363, 364; 395/200.75, 200.66, 200.47

[56] References Cited

U.S. PATENT DOCUMENTS

| | | | |
|---|---|---|---|
| 4,355,388 | 10/1982 | Deal | 370/104 |
| 5,671,371 | 9/1997 | Kondo et al. | 395/306 |

*Primary Examiner*—Michael Horabik
*Assistant Examiner*—Binyam Tadesse
*Attorney, Agent, or Firm*—Richard A. Jordan

[57] ABSTRACT

A digital data transfer system comprises a source module and a destination module interconnected by an information transfer medium. The source module initiates a transfer operation in which it transfers a data item and an associated address over an information transfer medium. The address having an aperture identification portion that identifies one of a plurality of apertures. The destination module receives the data item and the associated address from the information transfer medium during the transfer operation, the destination module using the one of the plurality of apertures identified by the aperture identification portion to generate an aperture value for association with the data item. The source module can also initiate a retrieval operation, during which it transfers an address over the information transfer medium to retrieve previously transferred information. The address used during the retrieval operation also has an aperture identification portion that includes an aperture identification value that identifies one of a plurality of the apertures. The destination module provides a response value in response to the address provided by the source module during the retrieval operation. In one embodiment, the destination module transfers one of the previously-transferred data item or the generated aperture value, depending on the aperture identification portion of the address. In another embodiment, the destination module transfers the data item and a correspondence indication indicating whether the aperture value corresponds to the aperture identification value provided in the address.

38 Claims, 3 Drawing Sheets

5,953,343

DIGITAL INFORMATION TRANSFER SYSTEM AND METHOD

FIELD OF THE INVENTION

The invention relates generally to the field of systems and methods for transferring digital information, and more particularly to a system and method for efficiently transferring digital information between a source module and a destination module using a communication link, such as a bus, which has fewer information transfer lines than the number of bits in the respective digital information words to be transferred.

BACKGROUND OF THE INVENTION

Digital data processing systems typically include a variety of types of components, including processing elements, memory elements, input/output elements and the like, which are interconnected by a communication link such as a bus. Buses normally include a number of paths for transferring information, including a data transfer path for transferring data and an address transfer path for transferring an address identifying the particular component and perhaps a particular storage location in the component, to or from which data is to be transferred. Buses also generally include a transfer control path over which the components transfer information for controlling their access to the bus and transfer of data and addresses over the other transfer paths. In some buses, one transfer path is provided to carry both data and addresses, and the addresses and data are multiplexed over that transfer path.

Typically, the data transfer path can transfer a predetermined amount of digital data at one time, such as thirty-two, sixty-four, or the like, data bits. A problem arises if a component needs to transfer items of data which comprise a number of bits is are somewhat greater than the number of bits that the bus can transfer at one time. The component could transfer such data items in two transfers. However, that would reduce the efficiency of data transfer over the bus and complicate the addressing structure, since each transfer would need to have a separate address associated therewith.

SUMMARY OF THE INVENTION

The invention provides a new and improved system and method for transferring digital information over a bus.

In brief summary, the new digital data transfer system comprises a source module and a destination module interconnected by an information transfer medium. The source module initiates a transfer operation in which it transfers a data item and an associated address over an information transfer medium. The address having an aperture identification portion that identifies one of a plurality of apertures. The destination module receives the data item and the associated address from the information transfer medium during the transfer operation, the destination module using the one of the plurality of apertures identified by the aperture identification portion to generate an aperture value for association with the data item.

The source module can also initiate a retrieval operation, during which it transfers an address over the information transfer medium to retrieve previously transferred information. The address used during the retrieval operation also has an aperture identification portion that includes an aperture identification value that identifies one of a plurality of the apertures. The destination module provides a response value in response to the address provided by the source module during the retrieval operation. In one embodiment, the destination module transfers one of the previously-transferred data item or the generated aperture value, depending on the aperture identification portion of the address. In another embodiment, the destination module transfers the data item and a correspondence indication indicating whether the aperture value corresponds to the aperture identification value provided in the address.

Thus, the digital data transfer system provides a mechanism by which the source and destination modules can transfer information for storage, and retrieve the stored information, which information comprises more information, represented by the aperture values, than can be transferred over the information transfer medium in one transfer or retrieval operation.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1A:
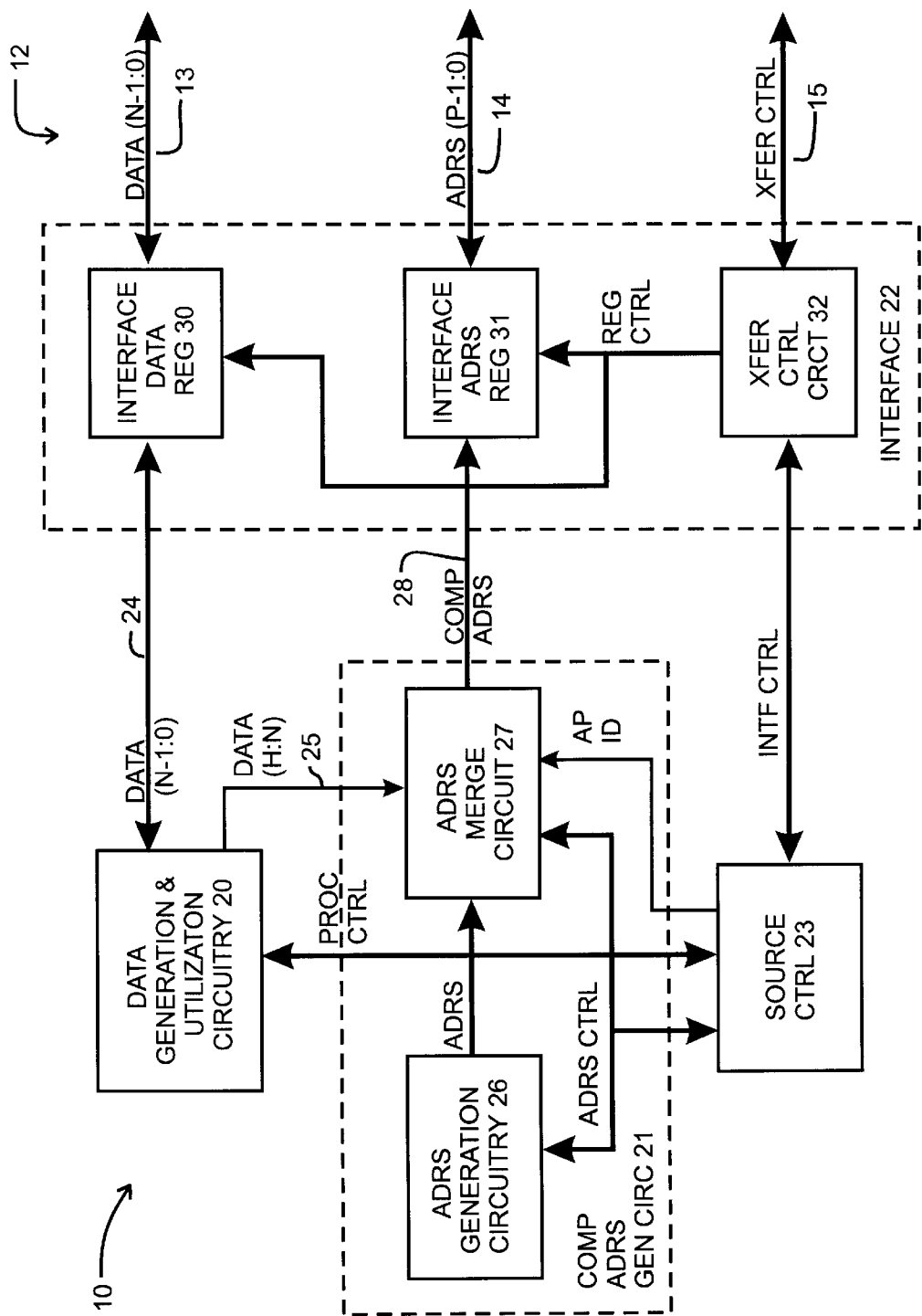
FIGS. 1A and 1B depict a functional block diagram of a digital data transfer system constructed in accordance with the invention, with FIG. 1A depicting a functional block diagram of a digital data source module and FIG. 1B depicting a functional block diagram of a digital data destination module.
Figure 1B:
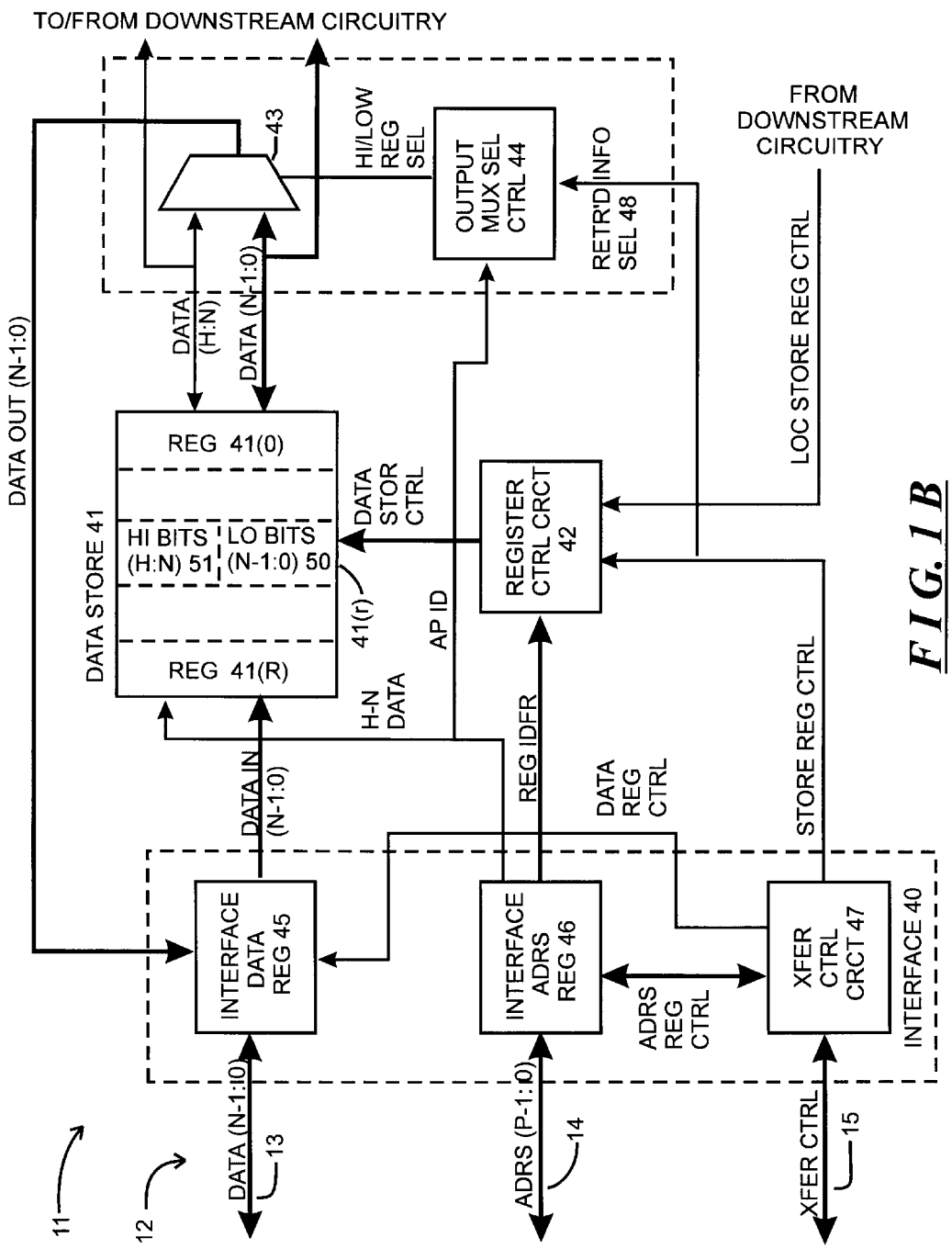

FIGS. 1A and 1B together depict a functional block diagram of a digital data transfer system constructed in accordance with the invention, comprising a digital data source module 10 (a functional block diagram of which is depicted in FIG. 1A) and a digital data destination module 11, a functional block diagram of which is depicted in FIG. 1B, interconnected by a bus 12. The destination module 11 may comprise or include, for example, a memory device for storing digital data, and the source module 10 may comprise, for example, a microprocessor or other device which can initiate transfer of digital data to the destination module 11 for storage and/or retrieval of digital data from the destination module 11 for processing.

Generally, the source and destination modules 10 and 11 transfer digital data, in the form of words, over bus 12. The bus 12 has a data transfer path 13 which can transfer a number "N" of data bits in parallel, which number is somewhat less than the number of bits "H" in a word to be transferred. In accordance with the invention, during a storage operation, the source module can transfer the "H" bit data word to the destination module 11 over the bus 12 in one transfer, using both the data transfer path 13 and an address transfer path 14, thereby avoiding the necessity of dividing the "H" bit data word into two or more portions and transferring the respective portions to the destination module 11 in separate transfers. During a retrieval operation, in which the source module 10 retrieves digital data from the destination module 11, in one embodiment the data word to be retrieved is divided into two or more portions and the source module 10 can retrieve the portions of the "H" bit data word in respective separate transfers. In that case, the two portions will be transferred over the data transfer path 13 during separate transfers.

In a second embodiment, the digital data to be retrieved is also divided into respective portions, but only one portion of the data word will be transferred during the retrieval operation, which portion will be transferred over the data transfer path 13. To determine the value of the other portion, the source module 10 will provide, along with a retrieval command that it will provide to initiate the retrieval operation, information over the address transfer path 14 as to the value that it believes comprises the other portion. The destination module 11, in addition to transferring the portion of the data word over the data transfer path 13, will also provide an error indication over a transfer control path 15 of bus 13, which error indication will indicate whether the value of the other portion corresponds to the value whose information was provided by the source module 10. The source module 10 can infer the value of the other portion from the error indication provided by the destination module. If the other portion can have one of two values, which can occur if the other portion comprises, for example, a single bit, the source module 10 can both retrieve the one portion and determine the value of the other portion in a retrieval operation comprising a single transfer, since (i) if the error indication indicates that the value of the other portion conforms to the value provided by the source module 10, the source module can determine that it has correctly assumed the value of the other portion as maintained by the destination module 11, whereas (ii) if the error indication indicates that the value of the other portion does not conform to the value provided by the source module 10, the source module can determine that the correct value of the other portion as maintained by the destination module 11 is the other of the two possible values.

The system generally performs these operations in the following manner. During a storage operation, the source module 10 provides, contemporaneous with the "N" data bits, operation command and control information over the transfer control path 15 which identifies the operation as a storage operation. In addition, the source module 10 provides an address over address transfer path 14 which identifies the destination module 11, a storage location maintained by the destination module 11 in which the data word is to be stored, and a number "H–N" of the data bits, all to the destination module 11. The source module provides the "N" data bits in parallel over a the data transfer path 13. In one embodiment, the portion of the address which identifies the destination module 11 form the high-order portion of the address that is provided to the destination module 11, the "H–N" data bits form an intermediate portion of the address, and the portion of the address which identifies the storage location in which the data word is to be stored form the low-order portion of the address. In that embodiment, the address has a structure <DEST_ID|H–N_DATA_BITS|STOR_LOC_ID>, where "DEST_ID" represents the high-order portion of the address which identifies the destination module 11, "H–N_DATA_BITS" represents the "H–N" data bits which are transmitted as the intermediate portion of the address, "STOR_LOC_ID" represents the low-order portion of the address, and the vertical bar "|" indicates that the respective portions are concatenated to form a unitary address. The source module 10 also provides the bits comprising the address in parallel over the address transfer path 14.

When the destination module 11 receives the operation command and control information, the address and the associated "N" data bits over the associated transfer paths 13 and 14 of the bus 12, it (that is, the destination module 11) will determine (i) from the high-order bits of the address whether it (that is, the destination module 11) is the module connected to the bus 12 that is to participate in the transfer and, in this case, receive and store the data, and, if so, (ii)(a) from the low-order bits of the address, the particular storage location in which data is to be stored, and (ii)(b) from the intermediate portion of the address, one of a plurality of values which is to be stored in the storage location along with the "N" data bits.

If the destination module 11 makes a positive determination in item (i) above, that is, if the high-order "DEST_ID" bits of the address indicate that it is to participate in the transaction, it will store the contemporaneously-transferred "N" data bits in a portion of the storage location identified by the low order "STOR_LOC_ID" bits of the address. In one embodiment, the destination module 11 will store the contemporaneously-transferred "N" data bits in a low-order portion of the storage location.

In addition, the destination module will store a value in the high-order portion of the same storage location, which value is determined by the intermediate "H–N" bits of the address. The intermediate portion of the address essentially defines one of a plurality of "apertures" in the portion of the destination module's address space, each aperture being associated with one of the plurality of predetermined values which will be stored along with the "N" data bits. It will be appreciated that the H–N data bits in the intermediate portion define $2^{H-N}$ unique binary-encoded values, and thus the same number of apertures will be defined by the "H–N" bits in the intermediate portion. In one embodiment, for each aperture, the predetermined value which is stored in the high-order portion of the storage location identified by the "STOR LOC_ID" low-order storage location identifier portion of the address corresponds to the binary-encoded value of the bits identifying the particular aperture, so that the "H–N" bits from the intermediate portion of the address will effectively be stored in the high-order portion of the storage location that is identified in the low-order portion of the address. In that embodiment, if the "H–N" bits of the intermediate portion of the address define the binary encoded value zero, then the binary-encoded value "zero" will be stored in the storage location along with the "N" data bits. In that same embodiment, if the "H–N" bits of the intermediate portion of the address define the binary-encoded value "one," then the binary-encoded value "one" will be stored in the storage location along with the "N" data bits, and so forth. Generally, however, it will be appreciated that each aperture can be associated with one or more bits defining any selected binary-encoded value to be stored in the storage location identified by the "STOR_LOC_ID" low-order portion of the address.

During a retrieval operation, in which the source module 10 retrieves the contents of a storage location in the destination module 11, the source module 10 also provides operation command and control information over the transfer control path 15 and an address over address transfer path 14. The address has a structure similar to that provided during a storage operation, in particular <DEST_ID|AP_ID|STOR_LOC_ID>, where "DEST_ID" represents the high-order bits of the address which identify the destination module 11, "STOR_LOC_ID" represents the low-order bits of the address and the vertical bar "|" indicates that the respective portions are concatenated to form a unitary address. The "AP–ID" "aperture identifier" intermediate bits, which comprise "H–N" bits, indicate the portion of the data stored in the storage location identified by the "STOR_LOC_ID" bits which the destination module 11 is to transfer to the source module 10 during the retrieval operation. In that operation, if the "AP_ID" intermediate bits define the binary-encoded value "zero," the destination module 11 will transfer to the source module 10 over the data transfer path 13 the "N" data bits from the portion of the identified storage location in which the original "N" data bits from the source module 10 were stored. As indicated above, in one embodiment the "N" data bits are stored in the low-order portion of the storage location, and so if the "AP_ID" aperture identifier portion of the address define the binary-encoded value "zero," the destination module 11 will provide the value contained in the low-order portion of the storage location identified by the "STOR_LOC_ID" low-order bits of the address.

On the other hand, in that same embodiment, if the "AP_ID" aperture identifier intermediate bits of the address define a binary-encoded value other than zero, during the retrieval operation the destination module 11 will return a value to the source module 10 over data transfer path which is representative of the value stored in the high-order portion of the storage location identified by the "STOR_LOC_ID" "storage location identifier" low-order bits of the address. In one embodiment, if the "AP_ID" aperture identifier intermediate bits identify any value other than zero, the destination module 11 will return, as data, all of the bits stored in the high-order portion of the storage location identified by the "STOR_LOC_ID" low-order bits of the address, to the source module 10.

In a second embodiment, as described above, the destination module 11, during a single retrieval operation, transfers, along with the "N" data bits stored in the low-order portion of the storage location identified by the "STOR_LOC_ID" low-order storage location identifier bits of the address provided by the source module 10, an error status indication over transfer control path 15 of bus 12. As in the first embodiment, the destination module 11 will transfer the "N" data bits over the data transfer path 13 of bus 12. The error status indication indicates whether the value stored in the high-order portion of the same storage location corresponds to a value associated with the aperture associated with the "AP_ID" intermediate aperture identifier bits of the address. For example, if, during a retrieval operation, the source module 10 provides an address which has "AP_ID" intermediate aperture identifier bits which define the binary-encoded value "zero," if the high-order portion of the storage location identified by the "STOR_LOC_ID" storage location identifier bits contains a value associated with that aperture, the destination module 11 will provide, along with the low-order "N" data bits from the storage location, a "no-error" error status indication.

On the other hand, if the high-order portion of the storage location contains a value that is not associated with the aperture identified by the "STOR_LOC_ID" storage location identifier bits, the destination module 11 will provide, along with the low-order "N" data bits from the storage location, an "error" error status indication over the transfer control path 15. Similar operations occur in connection with retrieval operations for which the "AP_ID" intermediate aperture identifier bits identify other apertures. Thus, in this embodiment, the source module 10 can, in addition to retrieving the low-order "N" data bits from the storage location identified by the "STOR_LOC_ID" low-order storage location identifier bits of the address provided during the retrieval operation, also determine from the error status indication whether the high-order portion contains a value that corresponds to the aperture whose value is defined by the "AP_ID" intermediate aperture identifier bits of the same address.

The invention will find utility in a number of environments. In one embodiment, the invention is used in a digital data communication system in which the system including both the source module 10 and the destination module 11 comprise at least a portion of a data transmission arrangement that transmits data in the form of frames to one or more other devices (not shown). In that embodiment, the source module 10 provides data to the destination module 11 that is to be transmitted to a destination. The data to be transmitted comprises the "N" data bits which are stored in the low-order portions of successive storage locations in the destination module 11, and the "H-N" bits which are stored the high-order portions in each of the successive storage locations words provide control information concerning the data to be transmitted. In particular, the "H-N" bits stored in the high-order portion indicate whether the data stored in the low-order portion is the end of a frame. The destination module 11 can use this information to identify the end of each frame, so that it may, for example, transmit predetermined protocol information which may be required to transfer information to the destination, or to one of a plurality of destinations if the destination module 11 can transfer information to multiple destinations. It will be appreciated that a single bit may suffice in this connection, since, for example, a bit having a binary-encoded value of "one" in the high-order portion of a storage location may be used to indicate that the data in the associated low-order portion is the end of a frame, with the preceding series of storage locations for which the high-order bit has the binary-encoded value "zero" contain data which is in the same frame.

In that embodiment, the source module 10 can control the value stored in the high-order bit of the storage location in which data is to be stored, thereby indicating whether or not the data is at the end of a frame, by suitable conditioning of a single "H-N_DATA BIT" bit comprising intermediate portion of the address which it provides along with the data. Thus, it for example, the source module 10 provides an address in which the "H-N_DATA_BIT" bit has the binary-encoded value of "zero," the destination module 11 can determine that the accompanying data does not form the end of a frame, and in that case will load data having the binary-encoded value "zero" in the high-order bit of the storage location in which it stores the accompanying data. On the other hand, if the source module 10 provides an address in which the "H-N_DATA_BIT" of the address has the binary-encoded value of "one," the destination module 11 can determine that the accompanying data does form the end of a frame, and in that case will load data having the binary-encoded value "one" in the high-order bit of the storage location in which it stores the accompanying data. Thus, the source module 10 can control the value stored in the high-order bit of the storage location in the same transfer in which the data to be stored is transferred, thereby avoiding the necessity of providing a second transfer to control the value stored in the high-order bit.

In that same embodiment, during a diagnostic procedure to verify correct operation of the destination module 11, the source module 10 may periodically need to retrieve the contents of a particular storage location in the destination module 11 to, for example, determine whether the "N" data bits and "H-N" high-order bits were properly stored. Thus, for example, in the embodiment described above in which the destination module 11 transfers both the bits from the high-order portion and the bits from the low order portion of the storage location whose contents are to be retrieved, two transfers will be performed to transfer the entire contents of the storage location. In one transfer, which is enabled when the source module 10 provides an address which contains, along with a "STOR_LOC_ID" portion identifying a particular storage location, an "AP_ID" aperture identifier portion which has a binary-encoded value of "zero," the destination module 11 will transfer the data bits from the low-order portion of the identified storage location over the data transfer path 13. In the second transfer, which is enabled when the source module 10 provides an address which contains, along with a "STOR_LOC_ID" portion identifying a particular storage location, an "AP_ID" aperture identifier portion which has a binary-encoded value of "one," the destination module 11 will transmit the data bit from the high-order portion of the identified storage location over the data transfer path 13. It will be appreciated that, depending on the particular diagnostic operations being performed, the source module 10 need not perform both retrieval operations, particularly if it need only determine that the respective storage locations are correctly storing the high-order control information bit.

In the alternate retrieval arrangement, the source module 10 will also provide an address which contains an "AP_ID" aperture identifier portion that has a binary-encoded value that identifies a particular aperture and a "STOR_LOC_ID" storage location identifier portion that identifies a particular storage location. In that arrangement, the source module 10 will preferably provide a binary-encoded value in the "AP_ID" aperture identifier portion that corresponds to the particular aperture that it believes is identified in the high-order portion of the storage location identified by the "STOR_LOC_ID" storage location identifier portion of the address. The destination module 11 will return the contents of the low-order portion of the storage location as data, and will provide an indication over an error line of the bus 12 interconnecting it and the source module 10 as to whether the aperture identified in the high-order portion corresponds to the aperture identified in the "AP_ID" aperture identifier portion. Accordingly, the source module 10, using one transfer, can determine both the data in the storage location which is to be transmitted by the destination module 11, and also determine whether the control information stored in the location corresponds to the control information which it believes is in the storage location as indicated by the "AP_ID" aperture identifier portion of the address.

The source module 10 and the first embodiment of the destination module 11 will be more particularly described in connection with the functional block diagrams depicted respectively in FIGS. 1A and 1B, and the second embodiment of the destination module, identified by reference numeral 111, will be described below in connection with FIG. 2. With reference initially to FIG. 1A, the digital data source module 10 includes a number of components, including a data generation and utilization circuit 20, a composite address generation circuit 21 and a bus interface 22 all of which operate under control of a source control circuit 23.

Generally, the data generation and utilization circuit 20, under control of the source control circuit 23 processes data, which may be received from the destination module 11 or from other components (not separately shown) included in a system including the source module 10. The data generation and utilization circuit 20, under control of PROC_CTRL processing control signals from the source control circuit 23, generates processed data for, inter alia, transfer to the destination module 11 for storage during storage operations. In addition, the data generation and utilization circuit 20 processes data which the source module 10 retrieves from the destination module 11 during retrieval operations. The composite address generation circuit 21, under control of ADRS_CTRL address control signals from the source control circuit 23, generates composite addresses to be used during storage and retrieval operations.

The interface circuit 22 connects to the data generation and utilization circuit 20 and the composite address generation circuit 21 and operates under control of the INTF_CTRL interface control signals from the source control circuit 23. During a storage operation, the interface circuit 22 controls the transfer of data over the data transfer path 13 and composite addresses over the address transfer path 14, to the destination module 11. During a retrieval operation, the interface circuit 22 controls the transfer of the composite addresses to the destination module 11 over the address transfer path 14 and the receipt of data over the data transfer path 13 from the destination module 11. During both storage and retrieval operations, the interface circuit 22 and destination module 11 exchange XFER_CTRL transfer control signals which include transfer control information for controlling the transfer of the data and composite address information paths 13 and 14 as well as operation command information which identifies the type of operation to be performed.

The data generation and utilization circuit 20 processes and generates data in the form of words of varying sizes, each size having predetermined numbers of bits. Generally, the data generation and utilization circuit will process data, and generate processed data, in word sizes of eight, sixteen, thirty-two, sixty-four, and so forth, bits (generally a word size which is a power of two). In connection with operations in connection with the invention, however, the data generation and utilization circuit 20 generates data in a word size of "H+1" bits, which in one embodiment corresponds to thirty-three bits. When the source module 20 is to transfer data to the destination module 11 for storage, the data generation and utilization module 20 provides data in the form of DATA (H:0) signals which are divided into DATA (N-1:0) signals on a bus 24 which represent "N" data bits, as well as DATA (H:N) signals on a bus 25 which represent "H–N" data bits. The data transfer path 13 of bus 12 includes "N" lines for carrying data signals in parallel, and in particular will be used to transfer the "N" data signals DATA (N-1:0) provided by the data generation and utilization module over bus 24.

The composite address generation circuit 21 generates composite addresses which are provided to the bus interface 22 as ADDRESS (P-1:0) signals on a bus 26 for use in storage and retrieval operations. The bus interface 22 uses the composite addresses in connection with storage and retrieval operations with the destination module 11. The composite address which the composite address generation circuit 21 provides to the bus interface 22, and which the bus interface 22, in turn, provides to the destination module 11, has the structure <DEST_ID|H–N_DATA_BITS|STOR_LOC_ID> as described above. The composite address generation circuit 21 includes an address generation circuit 26 which generates the DEST_ID high-order destination identifier portion and the STOR_LOC_ID low-order storage location identifier portion of the address, which are provided as ADDRESS address signals to an address merge circuit 27.

The address merge circuit 27 receives the ADDRESS signals representing the DEST_ID destination identifier portion and the STOR_LOC_ID storage location identifier portion, and uses them in generating the COMP ADDRESS composite address signals. In addition, during a storage operation, in which the source module transfers data to the destination module for storage, the address merge circuit 27 receives the DATA (H–N) data signals from bus 25 and also uses them in generating the COMP ADDRESS composite address. In particular, the address merge circuit 27 uses the DEST_ID destination identifier and STOR_LOC_ID storage location identifier portions of the ADDRESS address signals defined by the low-order portions, respectively, of the composite address defined by the COMP ADDRESS signals. In addition, the address merge circuit 27 uses the DATA (H–N) data signal from bus 25 as the "H–N_DATA_BITS" intermediate portion of the composite address defined by the COMP ADDRESS signals.

During a retrieval operation, the address merge circuit 27 also receives the ADDRESS signals representing the DEST_ID destination identifier portion and the STOR_LOC_ID storage location identifier portion, and uses them in generating the COMP ADDRESS composite address signals. In addition, during a retrieval operation, the address merge circuit 27 also receives AP ID aperture identifier signals from, for example, the source control circuit 23 and also uses them in generating the COMP ADDRESS composite address. In particular, the address merge circuit 27 uses the DEST_ID destination identifier and STOR_LOC_ID storage location identifier portions of the ADDRESS address signals as the high- and low-order portions, respectively, of the composite address defined by the COMP ADDRESS signals. In addition, the address merge circuit 27 uses the AP ID aperture identifier signals as the "AP_ID" intermediate portion of the composite address defined by the COMP ADDRESS signals.

As described above, the bus interface 22, also operates under control of the source control circuit 23, and controls the transfer of signals representing addresses and data between the source module 10 and the destination module 11 over the bus 12. In addition, if bus 12 is connected to other components (not shown) in a system including source module 10, to which the source module 10 can transfer data or from which it can receive data, the interface 22 will also control the transfer of addresses and/or data with those other modules. The bus interface 22 includes several components, including a data register 30, an address register 31 and a transfer control circuit 32. Generally, the data register 30 will receive the data to be transferred, either from the data generation and utilization circuit 20 during a storage operation, or from the destination module 11 or another unit (not shown) connected to the bus 12 during a retrieval operation. For both storage operations and retrieval operations initiated by the source module 10, the composite address provided by the composite address generation circuit 21 will be provided to the address register 31 for storage. The transfer control circuit 32, under control of the INTERFACE CONTROL interface control signals from the source control circuit 23, controls the bus interface 22 and in addition generates and receives XFER_CTRL transfer control signals which control the transfer of the data and address signals over bus 12.

Operations performed by the bus interface 22 in transferring signals over the bus 12 are generally conventional, and will not be described herein in detail. Generally, during a storage operation, in which the source module 10 transfers data to the destination module 11, the portion data to be transferred represented by the DATA (N-1:0) signals on bus 24 will be loaded into the data register 30 under control of register control signals from the transfer control circuit 32. Similarly, the composite address represented by COMP ADDRESS signals, will be loaded into the address register 31, also under control of the register control signals from transfer control circuit 32. The transfer control circuit 32 will generate and receive XFER_CTRL transfer control signals over the bus 12 and will enable the contents of the address and data registers 31 and 30 to be gated onto appropriate lines of the bus 12 according to a predetermined information transfer protocol to enable the information to be received by the destination module 11. Operations performed by the destination module 11 during a storage operation will be described below in connection with FIG. B. The source module's bus interface 22 may perform similar operations in connection with storage operations with other modules (not shown) which are connected to bus 12.

On the other hand, generally during a retrieval operation, in which the source module 10 retrieves data from the destination module 11, a composite address represented by COMP ADDRESS signals, will be loaded into the address register 31 under control of the register control signals from transfer control circuit 32, and the transfer control circuit 32 will generate and receive XFER_CTRL transfer control signals over the bus 12 and will enable the contents of the address registers 31 to be gated onto appropriate lines of the bus 12 according to a predetermined information transfer protocol over bus 12, to enable the address to be received by the destination module 11. The destination module 11, in turn, will retrieve the data from the storage location identified by the composite address, and will transfer it as DATA (N-1:0) signals over the bus 12. The transfer control circuit 32, in turn, will enable the signals to be loaded into the data register 30. After the signals have been loaded in the data register 30, the transfer control circuit 32 can control the INTF_CTRL interface control signals to notify the source control circuit 23 that the data has been received, and the source control circuit 23 and transfer control circuit 32 can cooperate to enable the data in the data register 30 to be transferred as DATA (N-1:0) signals over bus 24 to the data generation and utilization circuit 20 for processing.

As described above, in one embodiment of the destination module 11, to be described below in connection with FIG. 1B, during a retrieval operation the destination module 11 will transfer to the source module 10 as DATA (N-1:0) signals the particular data bits from the portion of the storage location that is identified by the AP_ID intermediate aperture identifier portion of the address provided by the source module 10. In that embodiment, if the source module 10 wishes to retrieve all of the information contained in the storage location, it will initiate a plurality of retrieval operations with addresses whose AP_ID portions identify the respective apertures to be retrieved, and for each retrieval the destination module 11 will provide the data bits associated with the respective apertures as DATA (N-1:0) signals. As described above, the DATA (N-1:0) signals provided during each retrieval operation will be latched in the data register 30 under control of the transfer control circuit 32.

On the other hand, as described above in connection with the second embodiment of the destination module, identified by reference numeral 111 and described below in connection with FIG. 2, during a retrieval operation the destination module 111 will transfer to the source module 10 as DATA (N-1:0) signals the data bits from the low-order portion of the storage location identified by the STOR_LOC_ID storage location identifier. The data register 30, under control of the transfer control circuit 32, will receive the DATA(N-1:0) signals in the same manner as described above. In addition, the destination module 111 will provide, as one of the transfer control signals received by the transfer control circuit 32, a bus error signal indicating whether the high-order bits stored in the storage location correspond to the AP_ID aperture identifier bits in the address provided by the source module 10. The transfer control circuit 32 can provide, as one of the INTF_CTRL interface control signals that it provides to the source control circuit 23 indicating the status of the retrieval operation, a signal indicating the condition of the bus error signal provided by the destination module.

FIG. 1B depicts a functional block diagram of destination module 11. As indicated above, during a retrieval operation the destination module 11 transfers to the source module 10 as DATA (N-1:0) signals the particular data bits from the portion of the storage location that is identified by the AP_ID intermediate aperture identifier portion of the address provided by the source module 10, and separate retrieval operations will be performed to retrieve the entire contents of the storage location. With reference to FIG. 1B, destination module 11 includes a number of elements, including a bus interface 40, a data store 41, a data store control circuit 42, and a retrieved information selector 48 comprising an output multiplexer 43 and an output multiplexer control circuit 44.

The destination modules bus interface 40 is constructed generally similarly to the source module's bus interface 22, and includes a data register 45 and an address register 46, both of which operate under control of a transfer control circuit 47. The data register 45, during a storage operation, receives DATA (N-1:0) data signals from data transfer path 13 of bus 12 and couples them to the data store 41 as DATA IN (N-1) signals. During a retrieval operation, the data register 45 receives data from the data store 41 as DATA OUT (N-1:0) signals for transfer over the data transfer path 13. The address register 46, during both storage and retrieval operations, receives the addresses transferred over the address transfer path 14. If the "DEST_ID" high-order portion of the address identifies the destination module 11, the address register 46 will couple the "STOR_LOC_ID" low-order storage location identifier portion of the address as REG_IDFR register identifier signals. During a storage operation, the address register 46 will also couple the "H-N_DATA_BITS" intermediate portion of the address to the data store 41 as H-N DATA signals, and during a retrieval operation, the address register will couple the AP_ID intermediate portion of the address to the output multiplexer control circuit 44.

The data store 41 comprises a plurality of storage registers 41(0) through 41(R) (generally identified by reference numeral 41(r)) which comprise the storage locations in which data received by the destination module 11 as described above. Storage of data in, and retrieval of data from, the storage registers 41(r) is controlled in response to DATA_STORE_CTRL data store control signals from the register control circuit 42, which in turn, operates in response to STORE_REG_CTRL storage register control signals from the bus interface 40 and LOC_STORE_REG_CTRL local storage register control signals generated by downstream circuitry (not shown) in the destination module 11. The particular downstream circuitry that is provided for the destination module 11 will depend on the particular function or functions performed by the destination module 11; in one embodiment, in which the destination module 11 comprises a portion of a data transmission arrangement that transmits data to one or more other destinations (not shown), the downstream circuitry comprises circuitry that enables the contents of the data store 41 to be retrieved from the data store 41 and transferred to the respective destinations.

Each storage register 41(r) of the data store 41 includes a low-order portion 50 and a high-order portion 51. During a storage operation in connection with a storage register 41(r) identified by the STOR_LOC_ID low-order storage location identifier portion of the address provided by the source module 10, the low-order portion 50 of the storage register 41(r) receives the low-order "N" data bits transmitted by the source module 10 as DATA (N-1:0) signals over lines 13 of bus 12. Contemporaneously, the high-order portion 51 of the storage register receives and stores H-N DATA signals represented by the "H-N_DATA_BITS" intermediate portion of the address provided by the source module 10. During a retrieval operation initiated by either the source module 10 or by the destination module's downstream circuitry (not shown) in connection with a storage register 41(r), the data store 41 will provide the contents of the storage register 41(r). If the retrieval operation is initiated by the source module, the multiplexer 43 will select the "N" data bits from the low-order portion 50 or the "H-N" data bits from the high-order portion for transmission to the source module 10 based on the AP_ID portion of the address provided by the source module 10. On the other hand, during a retrieval operation initiated by the destination module's downstream circuitry in connection with a storage register 41(r) of the data store 41, the data store 41 will transfer the contents of both the low-order portion 50 and the high-order portion 51 of the storage register 41(r) to the downstream circuitry. In the embodiment, described above, in which the destination module 11 comprises part of a frame-based data transmission arrangement, the downstream circuitry can use the data bits from the high-order portion 51 of each storage register 41(r) to determine whether the data bits retrieved from the low-order portion of the respective storage register 41(r) form the end of a frame of data.

Storage of data in, and retrieval of data from, storage registers 41(r) in the data store 41 is controlled by the register control circuit 42 under control of control signals it (that is, the register control circuit 42) receives from the interface 40 and the downstream circuitry. In addition, the register control circuit 42 receives register identifier signals from the interface 40 which identify the particular storage register 41(r) into which data is to be stored or from which it is to be retrieved. The bus interface 40 generates the register identifier signals from the STOR_LOC_ID low-order storage location identifier portion of the address that the source module 10 provides over address lines 14.

The register control circuit 42 may also receive register identifier signals from the downstream circuitry in connection with retrieval of data therefrom for transfer to the downstream circuitry. Alternatively, the register control circuit 42 may determine the particular storage register 41(r) whose contents are to be provided to the downstream circuitry. In one embodiment, in which the destination module 11 comprises part of a data transmission arrangement, generally the destination module will transmit data from successive storage registers 41(r) in the data store 41, and so the register control circuit 42 may itself determine the particular storage registers 41(r) whose contents are to be provided for transmission. In any case, the register control circuit 42 generates DATA_STOR_CTRL data store control signals for identifying the storage register 41(r) and controlling storage of data therein or retrieval therefrom.

As described above, if a retrieval operation is initiated by the source module 10, the multiplexer 43 will select the "N" data bits from the low-order portion 50 or the "H-N" data bits from the high-order portion 51 for transmission to the source module 10 based on the AP_ID portion of the address provided by the source module 10. Selection by the multiplexer 43 is controlled by the output multiplexer select control circuit 44 which, in turn, is controlled by an AP ID aperture identifier signal from the bus interface 40. The bus interface 40 provides the AP ID aperture identifier signal to conform to the "AP_ID" intermediate aperture identifier portion of the address provided by the source module 10 over address lines 14 to initiate the retrieval operation. The AP ID aperture identifier signal provided by the bus interface 40 identifies the particular aperture whose data is to be retrieved.

In the embodiment depicted in FIG. 1B, if the AP_ID intermediate aperture identifier portion of the address has a binary-encoded value of zero, the destination module 11 will provide the data bits from the low-order portion 50 of the storage register 41(r) identified by the STOR_LOC_ID low-order storage location identifier portion of the address. On the other hand, if the AP_ID intermediate aperture identifier portion of the address has a binary-encoded value other than zero, the destination module 11 will provide the data bits from the high-order portion 51 of the storage register 41(r) identified by the STOR_LOC_ID low-order storage location identifier portion of the address. In that embodiment, if the AP ID aperture signal provided by the bus interface 40 identifies the aperture associated with the binary-encoded value of zero, the output multiplexer select control 44 will generate the multiplexer control signal to enable the multiplexer 43 to couple the DATA (N-1:0) signal to the bus interface 40 for transfer to the source module 10. On the other hand, if the AP ID aperture signal provided by the bus interface 40 identifies the aperture associated with the binary-encoded value other than zero, the output multiplexer select control 44 will generate the multiplexer control signal to enable the multiplexer 43 to couple the DATA (H:N) signal to the bus interface 40 for transfer to the source module 10.

As described above, in a second embodiment of the data transmission system, during a retrieval operation the source module 10 will also provide an address over address lines 14 having an AP_ID intermediate aperture identifier portion and a STOR_LOC_ID low-order storage location identifier portion. In response the destination module, will transfer to the source module 10 the contents of the low-order portion of the storage register identified by the STOR_LOC_ID portion over the data lines 13 of bus 12, and an error code over the transfer control lines 15 of bus 12. The error code provided by the destination module indicates whether the contents of the high-order portion of the storage register identified by the STOR_LOC_ID low-order portion conform to the aperture identified by the AP_ID intermediate aperture portion of the address provided by the source module 10. A functional block diagram of a destination module useful in the second embodiment is depicted in FIG. 2 and identified by reference numeral 111.

Figure 2:
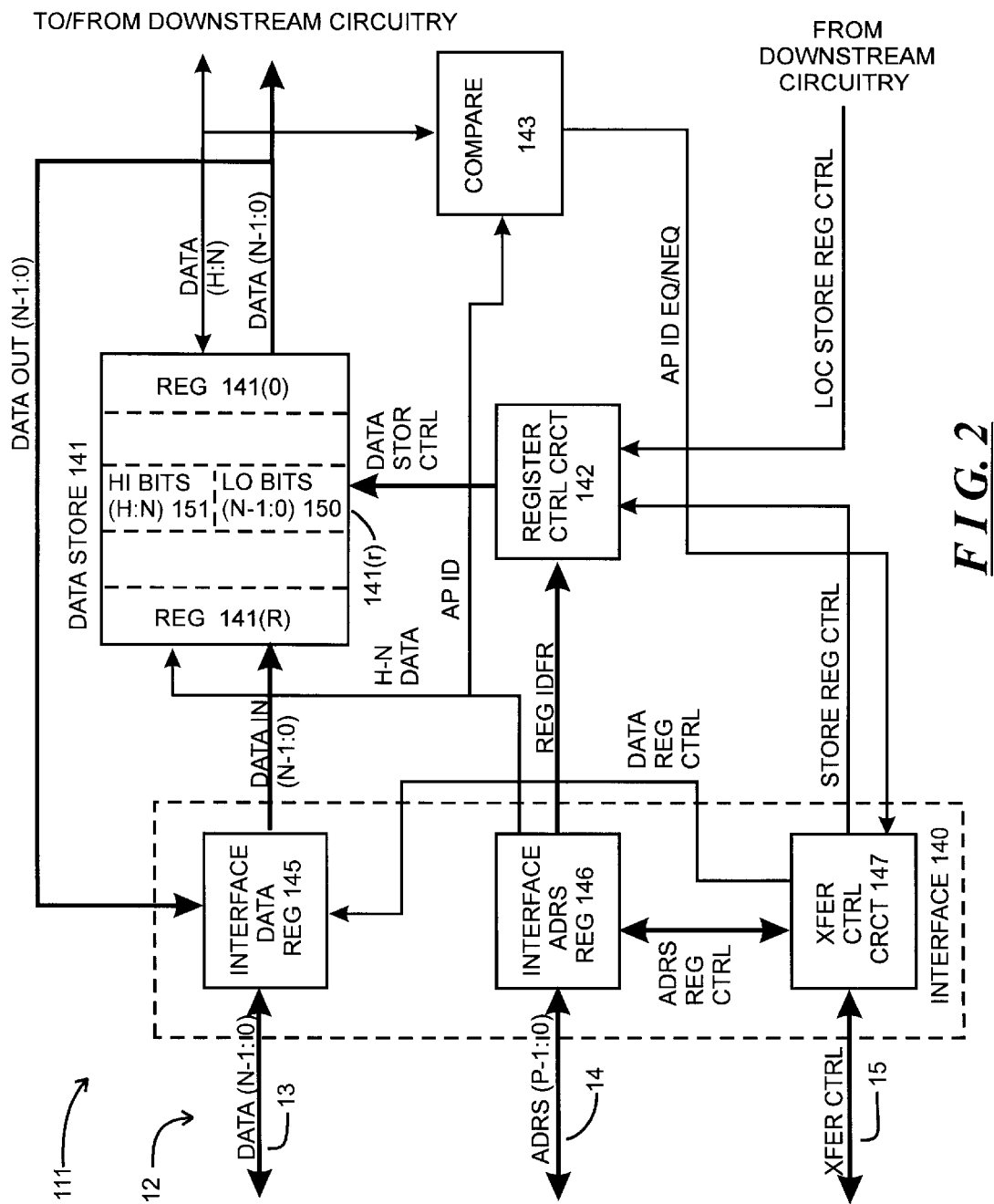
FIG. 2 is a functional block diagram of a second embodiment of a digital data destination module constructed in accordance with the invention.

With reference to FIG. 2, the destination module 111 includes a number of elements, including a bus interface 140, a data store 141 and a register control circuit 142, which are similar to the bus interface 40, data store 41 and register control circuit 42 described above in connection with FIG. 1B. The various components of the destination module 111 operate in a manner similar to that described above in connection with storage operations and retrieval operations initiated by downstream circuitry (also not shown in FIG. 2). As with data store 41, the data store 141 of the destination module 111 includes a number of storage registers 141(0) through 141(R) (generally identified by reference numeral 141(r), each of which is identified by a unique encoding of the STOR_LOC_ID low-order storage location identifier portion of the address provided by the source module 10 over address lines 14 of bus 12. As with the destination module 11 depicted in FIG. 1B, each storage register 141(r) in the destination module includes a low-order portion 150 which receives and stores the "N" data bits provided by the source module 10 as DATA (N-1:0) signals over data lines 13 of bus 12 during a storage operation. In addition, each storage register 141(r) includes a high-order portion 151 which receives and stores the "H–N" data bits provided by the source module the "H-N_DATA_BITS" intermediate portion of the address provided over address lines 14 of bus 12.

Since the destination module 111 (FIG. 2), during a retrieval operation, will always transfer the contents of the low-order portion 150 of the storage register identified by the STOR_LOC_ID low-order storage location identifier portion of the address to the source module, and so the destination module 111 does not include an output multiplexer or select control circuit similar to elements 43 and 44 of the destination module 11 (FIG. 1B). Instead, the output of data store 141 is connected directly to the bus interface 140 so that, during a retrieval operation initiated by source module 10, the data from the low-order portion 150 of the storage register 141(r) identified by the STOR_LOC_ID low-order storage location identifier portion will be provided as DATA OUT (N-1:0) signals to the bus interface 140.

In addition, the destination module 111 also is provided with a comparator 143 that, during a retrieval operation, determines whether the aperture identified in the address provided by the source module 10 during the retrieval operation conforms to the aperture identified by the contents of the high-order portion of the storage location identified by the address. During a retrieval operation, the contents of the high-order portion of the storage location identified by the STOR_LOC_ID low-order storage location identifier portion of the address provided by the source module over address lines 14 of bus 12 are coupled to the comparator 143 as DATA (H:N) signals. In addition, the comparator 143 receives AP ID signals from the bus interface 140 which represents the aperture identified by the AP_ID intermediate aperture identifier portion of the same address. If the comparator 143 determines that the DATA (H:N) signals conform to the AP ID signals, which will occur if the aperture identified in the high-order portion 151 of the storage register 141(r) conforms to the aperture identified by the AP_ID intermediate aperture identifier portion of the address, it (that is, the comparator 143) will generate an AP ID EQ/NEQ aperture identifier equal/not equal signal to indicate that the aperture identified in the address does conform to the aperture identified in the high-order portion 151 of the storage register 141(r). The bus interface 140 receives the AP ID EQ/NEQ signal and, in this case, will generate a bus error signal for transfer over transfer control lines 15 of bus 12 which indicates that the aperture identified by the high-order portion 151 of the storage register 141(r) conforms to the "AP_ID" intermediate aperture identifier portion of the address provided by the source module 10.

However, if the comparator 143 determines that the DATA (H:N) signals do not conform to the AP ID signals, which will occur if the aperture identified in the high-order portion 151 of the storage register 141(r) does not conform to the aperture identified by the AP_ID intermediate aperture identifier portion of the address, it (that is, the comparator 143) will generate an AP ID EQ/NEQ aperture identifier equal/not equal signal to indicate that the aperture identified in the address does not conform to the aperture identified in the high-order portion of the storage location. The bus interface 140 receives the AP ID EQ/NEQ signal and, in this case, will generate a bus error signal for transfer over transfer control lines 15 of bus 12 which indicates that the aperture identified by the high-order portion 151 of the storage register 141(r) does not conform to the "AP_ID" intermediate aperture identifier portion of the address provided by the source module 10.

Thus, during a retrieval operation the destination 111 (FIG. 2), in addition to providing the contents of the low-order portion 150 of the storage register 141(r) identified in the address over data lines 13, will also provide a bus error signal over the transfer control lines 15 indicating whether the aperture identified in the high-order portion 151 of the same storage register 141(r) conforms to the aperture identified in the address. The source module 10 (FIG. 1A) can receive this and process the bus error signal as described above in connection with FIG. 1A.

The invention provides a number of advantages. In particular, it provides a mechanism by which the source and destination modules 10 and 11, interconnected by a bus 12, can transfer information for storage, and retrieve the stored information, which information comprises more data bits than can be transferred over the bus's data transfer path in one transfer.

It will be appreciated that a number of modifications may be made to the arrangements described above in connection with FIGS. 1A through 2. For example, the source module 10 (FIG. 1A) may comprise, for example, a microprocessor or a variety of other sources of digital data which can provide data and addresses as described above. The data generation and utilization circuitry 20 and composite address generation circuit 21 may comprise or include the same physical components of the source module, rather than separate components as indicated in FIG. 1.

Furthermore, although the bus 12 has been described as providing separate transfer paths for, for example, data and addresses, the bus 12 may use a single such transfer path over which such data and addresses will be transferred in a multiplexed manner.

In addition, although the source module 10 (FIG. 1A) and destination modules 11 (FIG. 1B) and 111 (FIG. 2) have been described as being used in a frame-based communication system, it will be appreciated that they may be used in a number of other applications.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A digital data transfer system comprising a source module and a destination module interconnected by an information transfer medium:
  A. the source module being configured to initiate a transfer operation in which it transfers a data item and an associated address over an information transfer medium, the address having an aperture identification portion that identifies one of a plurality of apertures; and
  B. the destination module being configured to receive the data item and the associated address from the information transfer medium during the transfer operation, the destination module using the one of said plurality of apertures identified by the aperture identification portion to generate an aperture value for association with the data item.

2. A digital data transfer system as defined in claim 1 in which the associated address further includes a storage location address portion defining a storage location address value, the destination module comprises an interface and at least one storage location identified by an address value, the interface receiving the data item and the associated address and storing the data item in the at least one storage location if the storage location address portion of the associated address defines a storage location address value that identifies the at least one storage location.

3. A digital data transfer system as defined in claim 2 in which the interface further stores the aperture value in the at least one storage location if the storage location address portion of the associated address defines a storage location address value that identifies the at least one storage location.

4. A digital data transfer system as defined in claim 2 in which the destination module comprises a plurality of storage locations each identified by an associated storage location address value, the interface receiving the data item and the associated address and storing the data item in one of said storage locations identified by said storage location address value.

5. A digital data transfer system as defined in claim 1 in which:
  A. said source module is further configured to initiate a retrieval operation in which it transfers an address over said information transfer medium, the address having an aperture identification portion that includes an aperture identification value that identifies one of a plurality of said apertures, and
  B. the destination module is further configured to provide a response value in response to the address provided during the retrieval operation.

6. A digital data transfer system as defined in claim 5 in which the destination module includes:
  A. at least one storage location including a data item storage portion configured to store a data item and an aperture value storage portion for storing an aperture value, and
  B. a retrieved information selector configured to selectively retrieve one of said data item or said aperture value from said storage location in response to said aperture identification value for transfer to said source module during said retrieval operation.

7. A digital data transfer system as defined in claim 6 in which:
  A. the at least one storage location comprises a data item storage portion and an aperture value storage portion; and B. the retrieved information selector includes:
   i. a multiplexer configured to selectively couple contents of said data item storage portion or said aperture value storage portion to said information transfer medium for transfer to said source module; and
   ii. a multiplexer control configured to control said multiplexer in response to said aperture identification value.

8. A digital data transfer system as defined in claim 5 in which the destination module includes:
   A at least one storage location including a data item storage portion configured to store a data item and an aperture value storage portion for storing an aperture value, and
   B. an information retrieval portion configured to retrieve said data item and said aperture value from said storage location, the information retrieval portion transferring said data item over said information transfer medium to said source module and a correspondence indication indicating whether the aperture identification value corresponds to the aperture value in said at least one storage location.

9. A digital data transfer system as defined in claim 8 in which:
   A. the at least one storage location comprises a data item storage portion and an aperture value storage portion; and
   B. the information retrieval portion includes:
      i. an information retriever configured to retrieve the contents of said at least one storage location during the retrieval operation and transfer said data item over said information transfer medium to said source module; and
      ii. a comparator configured to generate said correspondence indication indicating the correspondence between aperture identification value and the aperture value in said at least one storage location.

10. A digital data transfer system as defined in claim 1 in which said source module comprises:
   A. a data generation portion configured to generate a data word during said storage operation, the data word comprising said data item to be transferred during said storage operation; and
   B. an address generation portion configured to generate said associated address, the address generation portion using said data word to generate said aperture value.

11. A digital data transfer system as defined in claim 10 in which said data word further includes an aperture identifier, the address generation portion using the aperture identifier to generate said aperture value.

12. A source module for use in a digital data transfer system, the source module comprising:
   A. a data generation portion configured to generate a data word during said storage operation, the data word comprising a data item to be transferred during a storage operation; and
   B. an address generation portion configured to generate an address during said storage operation, the address generation portion using said data word to generate said aperture value.

13. A source module as defined in claim 12 in which said data word further includes an aperture identifier, the address generation portion using the aperture identifier to generate said aperture value.

14. A destination module for use in a digital data transfer system, the destination module comprising:

A. an interface configured to receive a data item and an associated address during a storage operation, the address having an aperture identification portion that identifies one of a plurality of apertures, the interface using the one of said plurality of apertures identified by the aperture identification portion to generate an aperture value for association with the data item, and
B. at least one storage location identified by an address value, the interface storing the data item and the aperture value in the at least one storage location if the storage location address portion of the associated address defines a storage location address value that identifies the at least one storage location.

15. A destination module as defined in claim 14, the destination module comprising a plurality of storage locations each identified by an associated storage location address value, the interface receiving the data item and the associated address and storing the data item and aperture value in one of said storage locations identified by said storage location address value.

16. A destination module for use in a digital data transfer system, the destination module comprising:
   A. at least one storage location including a data item storage portion configured to store a data item and an aperture value storage portion for storing an aperture value, and
   B. a retrieved information selector configured to selectively retrieve one of said data item or said aperture value from said storage location for transfer during a retrieval operation, in response to an aperture identification value included in an address received during the retrieval operation.

17. A destination module as defined in claim 16 in which:
   A. the at least one storage location comprises a data item storage portion and an aperture value storage portion; and
   B. the retrieved information selector includes:
      i. a multiplexer for selectively coupling contents of said data item storage portion or said aperture value storage portion for transfer; and
      ii. a multiplexer control configured to control said multiplexer in response to said aperture identification value.

18. A destination module for use in a digital data transfer system, the destination module comprising:
   A. at least one storage location including a data item storage portion configured to store a data item and an aperture value storage portion for storing an aperture value, and
   B. an information retrieval portion configured to retrieve said data item and said aperture value from said storage location during a retrieval operation, the information retrieval portion transferring said data item and a correspondence indication indicating whether an aperture identification value corresponds to the aperture value in said at least one storage location.

19. A destination module as defined in claim 18 in which:
   A. the at least one storage location comprises a data item storage portion and an aperture value storage portion; and
   B. the information retrieval portion includes:
      i. an information retriever configured to retrieve the contents of said at least one storage location during the retrieval operation and transfer said data item; and
      ii. a comparator configured to generate said correspondence indication indicating the correspondence between aperture identification value and the aperture value in said at least one storage location.

20. A method of transferring digital data between a source module a destination module interconnected by an information transfer medium:
   A. enabling the source module to initiate a transfer operation in which it transfers a data item and an associated address over an information transfer medium, the address having an aperture identification portion that identifies one of a plurality of apertures; and
   B. enabling the destination module to receive the data item and the associated address from the information transfer medium during the transfer operation, the destination module using the one of said plurality of apertures identified by the aperture identification portion to generate an aperture value for association with the data item.

21. A method as defined in claim 20 in which the associated address further including a storage location address portion defining a storage location address value, the destination module comprising an interface and at least one storage location identified by an address value, the interface being enabled to receive the data item and the associated address and store the data item in the at least one storage location if the storage location address portion of the associated address defines a storage location address value that identifies the at least one storage location.

22. A method as defined in claim 21 in which the interface is further enabled to store the aperture value in the at least one storage location if the storage location address portion of the associated address defines a storage location address value that identifies the at least one storage location.

23. A method as defined in claim 21 in which the destination module comprises a plurality of storage locations each identified by an associated storage location address value, the interface being enabled to receive the data item and the associated address and store the data item in one of said storage locations identified by said storage location address value.

24. A method as defined in claim 20 in which:
   A. said source module is further enabled to initiate a retrieval operation in which it transfers an address over said information transfer medium, the address having an aperture identification portion that includes an aperture identification value that identifies one of a plurality of said apertures, and
   B. the destination module is further enabled to provide a response value in response to the address provided during the retrieval operation.

25. A method as defined in claim 24 in which the destination module includes at least one storage location includes a data item storage portion configured to store a data item and an aperture value storage portion for storing an aperture value, the destination module being enabled to selectively retrieve one of said data item or said aperture value from said storage location in response to said aperture identification value for transfer to said source module during said retrieval operation.

26. A method as defined in claim 25 in which the at least one storage location comprises a data item storage portion and an aperture value storage portion, the selective retrieval step including the steps of:
   A. selectively coupling contents of said data item storage portion or said aperture value storage portion to said information transfer medium for transfer to said source module; and
   B. controlling said selective coupling in response to said aperture identification value.

27. A method as defined in claim 24 in which the destination module includes at least one storage location including a data item storage portion configured to store a data item and an aperture value storage portion for storing an aperture value, the destination module being enabled to retrieve said data item and said aperture value from said storage location, the information retrieval portion transferring said data item over said information transfer medium to said source module and a correspondence indication indicating whether the aperture identification value corresponds to the aperture value in said at least one storage location.

28. A method as defined in claim 27 in which the at least one storage location comprises a data item storage portion and an aperture value storage portion, the retrieval step including the steps of
   A. retrieving the contents of said at least one storage location during the retrieval operation and transfer said data item over said information transfer medium to said source module; and
   B. generating said correspondence indication indicating the correspondence between aperture identification value and the aperture value in said at least one storage location.

29. A method as defined in claim 20 in which said source module is enabled to
   A. generate a data word during said storage operation, the data word comprising said data item to be transferred during said storage operation; and
   B. generate said associated address, the address generation portion using said data word to generate said aperture value.

30. A method as defined in claim 29 in which said data word further includes an aperture identifier, the address generation portion using the aperture identifier to generate said aperture value.

31. A method of operating a source module for use in a digital data transfer system, the method comprising the steps of:
   A. generating a data word during said storage operation, the data word comprising a data item to be transferred during a storage operation; and
   B. generating an address during said storage operation, the address generation portion using said data word to generate said aperture value.

32. A method as defined in claim 31 in which said data word further includes an aperture identifier, the address generation step including the step of using the aperture identifier to generate said aperture value.

33. A method of operating a destination module in a digital data transfer system, the method comprising the steps of:
   A. receiving a data item and an associated address during a storage operation, the address having an aperture identification portion that identifies one of a plurality of apertures,
   B. using the one of said plurality of apertures identified by the aperture identification portion to generate an aperture value for association with the data item, and
   C. storing the data item and the aperture value in the at least one storage location if the storage location address portion of the associated address defines a storage location address value that identifies the at least one storage location.

34. A method as defined in claim 33, the destination module comprising a plurality of storage locations each identified by an associated storage location address value, the data item and aperture value being stored in one of said storage locations identified by said storage location address value.

35. A method of operating a destination module in a digital data transfer system, the method comprising the steps of:

A. providing at least one storage location including a data item storage portion configured to store a data item and an aperture value storage portion for storing an aperture value, and B. selectively retrieving one of said data item or said aperture value from said storage location for transfer during a retrieval operation, in response to an aperture identification value included in an address received during the retrieval operation.

36. A method defined in claim 35, the at least one storage location comprises a data item storage portion and an aperture value storage portion; the retrieved information selection step including the steps of:

A. selectively coupling contents of said data item storage portion or said aperture value storage portion for transfer; and B. controlling the selection in response to said aperture identification value.

37. A method of operating a destination module in a digital data transfer system, the method comprising the steps of:

A. providing at least one storage location including a data item storage portion configured to store a data item and an aperture value storage portion for storing an aperture value, and B. retrieving said data item and said aperture value from said storage location during a retrieval operation, and C. transferring said data item and a correspondence indication indicating whether an aperture identification value corresponds to the aperture value in said at least one storage location.

38. A method as defined in claim 37, the at least one storage location comprises a data item storage portion and an aperture value storage portion; and the information retrieval step including the steps of:

A. retrieving the contents of said at least one storage location during the retrieval operation and transfer said data item; and B. generating said correspondence indication indicating the correspondence between aperture identification value and the aperture value in said at least one storage location.

* * * * *